(12) United States Patent
Jeong et al.

(10) Patent No.: US 9,134,183 B2
(45) Date of Patent: Sep. 15, 2015

(54) TEMPERATURE SENSOR

(75) Inventors: Hyun Sik Jeong, Seoul (KR); Saeng Hwan Kim, Suwon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 604 days.

(21) Appl. No.: 13/337,210

(22) Filed: Dec. 26, 2011

(65) Prior Publication Data

US 2012/0257648 A1  Oct. 11, 2012

(30) Foreign Application Priority Data

Apr. 11, 2011 (KR) ........................ 10-2011-0033433

(51) Int. Cl.
*G01K 7/01* (2006.01)
*G01K 7/00* (2006.01)

(52) U.S. Cl.
CPC ........................................ *G01K 7/00* (2013.01)

(58) Field of Classification Search
CPC ........................................................ G01K 7/01
USPC ............. 374/178, 1, 170, 163, 171–173, 183, 374/184; 702/130, 99; 327/512, 513, 389, 327/427; 257/470, 467
See application file for complete search history.

(56) References Cited

U.S. PATENT DOCUMENTS

| | | | | |
|---|---|---|---|---|
| 4,140,930 A | * | 2/1979 | Tanaka | 327/81 |
| 4,448,549 A | * | 5/1984 | Hashimoto et al. | 374/170 |
| 5,095,227 A | * | 3/1992 | Jeong | 327/512 |
| 5,250,854 A | * | 10/1993 | Lien | 327/530 |
| 5,357,149 A | * | 10/1994 | Kimura | 327/512 |
| 5,512,855 A | * | 4/1996 | Kimura | 327/538 |
| 5,767,545 A | * | 6/1998 | Takahashi | 257/341 |
| 5,993,060 A | * | 11/1999 | Sakurai | 374/178 |
| 7,216,064 B1 | * | 5/2007 | Pippin | 703/1 |
| 7,368,956 B2 | * | 5/2008 | Chiu | 327/60 |
| 7,876,135 B2 | * | 1/2011 | Shkidt | 327/143 |
| 8,487,701 B2 | * | 7/2013 | Boujamaa et al. | 330/288 |
| 8,876,374 B2 | * | 11/2014 | Jeong | 374/170 |
| 2003/0098740 A1 | * | 5/2003 | Hsieh et al. | 327/543 |
| 2006/0152252 A1 | * | 7/2006 | Chiu | 327/100 |
| 2008/0013597 A1 | * | 1/2008 | Mikuni et al. | 374/178 |
| 2008/0291969 A1 | * | 11/2008 | Chu | 374/178 |
| 2009/0001186 A1 | * | 1/2009 | Cohen | 237/8 A |
| 2010/0127776 A1 | * | 5/2010 | Chow et al. | 330/277 |
| 2013/0170520 A1 | * | 7/2013 | Englasyam et al. | 374/178 |
| 2014/0146852 A1 | * | 5/2014 | Kim et al. | 374/178 |

FOREIGN PATENT DOCUMENTS

KR  100904738 B1  6/2009

* cited by examiner

*Primary Examiner* — Gail Kaplan Verbitsky

(74) *Attorney, Agent, or Firm* — William Park & Associates Ltd.

(57) ABSTRACT

A temperature sensor includes: a gate voltage generation unit including a bias resistor, a first source resistor, and a first MOS transistor and configured to generate a gate voltage; and a variable voltage output unit including an output resistor, a second source resistor, and a second MOS transistor and configured to generate the variable voltage.

9 Claims, 3 Drawing Sheets

TEMPERATURE SENSOR

CROSS-REFERENCES TO RELATED APPLICATIONS

The present application claims priority under 35 U.S.C 119(a) to Korean Application No. 10-2011-0033433, filed on Apr. 11, 2011, in the Korean intellectual property Office, which is incorporated herein by reference in its entirety.

BACKGROUND

With increasing demand on high performance of electronic systems such as personal computers or electronic communication devices, operation speed and memory capacity of semiconductor memory devices such as DRAM are being improved. A semiconductor memory device mounted in a mobile system operated by a battery, such as a mobile phone or notebook computer, requires low power consumption. Therefore, much research is being actively conducted on a method for reducing an operating current and a standby current.

A DRAM memory cell including one transistor and one storage capacitor has a temperature-sensitive data retention characteristic. Therefore, an operation condition of circuit blocks within a semiconductor integrated circuit needs to be controlled according to a variation of the surrounding temperature. For example, DRAM used in mobile products controls a refresh period according to a variation of the surrounding temperature. In order to control such an operation condition depending on the variation of the surrounding temperature, a temperature sensor such as a digital temp sensor regulator (DTSR) or analog temp sensor regulator (ATSR) may be used. Such a temperature sensor serves to sense a high temperature, thereby controlling an operation period so as to reduce current consumption in a self refresh mode and monitoring the surrounding temperature during a normal operation.

SUMMARY

An embodiment of the present invention relates to a temperature sensor capable of easily recognizing variability of a temperature signal even though a PVT variation occurs.

In one embodiment, there is provided a temperature sensor which compares a reference voltage having a constant level according to temperature change with a variable voltage having a variable level according to temperature change and generates a temperature signal. The temperature sensor includes: a gate voltage generation unit including a bias resistor, a first source resistor, and a first MOS transistor and configured to generate a gate voltage, wherein resistance changes of the bias resistor and the first source resistor based on temperature change are offset by each other, and slope change of the gate voltage based on the temperature change is determined according to a threshold voltage of the first MOS transistor; and a variable voltage output unit including an output resistor, a second source resistor, and a second MOS transistor and configured to generate the variable voltage, wherein resistance changes of the output resistor and the second source resistor based on temperature change are offset by each other, and slope change of the variable voltage based on the temperature change is determined according to a threshold voltage of the second MOS transistor.

In another embodiment, there is provided a temperature sensor which compares a reference voltage having a constant level according to temperature change with a variable voltage having a variable level according to temperature change and generates a temperature signal. The temperature sensor includes: a gate voltage generation unit including a bias resistor having a resistance value set by a test mode or fuse cutting, a first source resistor, and a first MOS transistor and configured to generate a gate voltage, wherein resistance changes of the bias resistor and the first source resistor based on temperature change are offset by each other, and slope change of the gate voltage based on the temperature change is determined according to a threshold voltage of the first MOS transistor; and a variable voltage output unit including an output resistor, a second source resistor, and a second MOS transistor and configured to generate the variable voltage, wherein resistance changes of the output resistor and the second source resistor based on temperature change are offset by each other, and slope change of the variable voltage based on the temperature change is determined according to a threshold voltage of the second MOS transistor.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
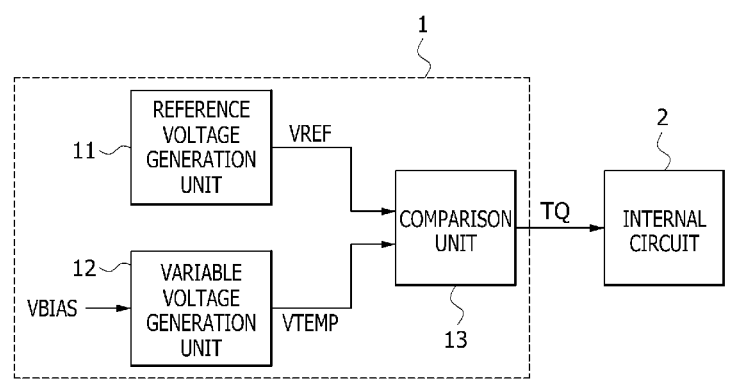
FIG. 1 illustrates the configuration of a semiconductor memory device including a temperature sensor in accordance with an embodiment of the present invention.

FIG. 1 illustrates the configuration of a semiconductor memory device including a temperature sensor in accordance with an embodiment of the present invention.

Referring to FIG. 1, the temperature sensor 1 in accordance with an embodiment of the present invention includes a reference voltage generation unit 11, a variable voltage generation unit 12, and a comparison unit 13. The reference voltage generation unit 11 is configured to generate a reference voltage VREF remaining constant in spite of varying temperature. The variable voltage generation unit 12 is configured to receive a bias voltage VBIAS and generate a variable voltage VTEMP having a variable level according to temperature change. The comparison unit 13 is configured to compare the levels of the reference voltage VREF and the variable voltage VTEMP and generate a temperature signal TQ.

In an embodiment of the present invention, the variable voltage VTEMP is set in such a manner as to have a level which linearly decreases as the temperature increases. Therefore, when the variable voltage VTEMP is at a lower level than that of the reference voltage VREF, the comparison unit 13 generates an enabled temperature signal TQ because the temperature is higher than the temperature corresponding to the reference voltage VREF.

An internal circuit 2 is configured to receive the temperature signal TQ and perform an internal operation based on temperature. The internal circuit 2 may include a circuit for controlling an internal operation. For example, when the internal circuit 2 is a refresh period control circuit and the enabled temperature signal TQ is inputted, the internal circuit 2 may reduce a refresh period so that a large number of refresh operations are performed per unit time.

Figure 2:
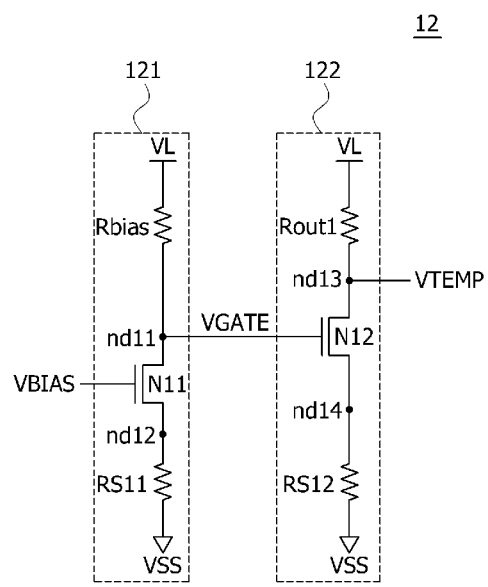
FIG. 2 is a circuit diagram of a variable voltage generation unit included in the temperature sensor of FIG. 1.

Referring to FIG. 2, the variable voltage generation unit 12 in accordance with an embodiment of the present invention includes a gate voltage generation section 121 and a variable voltage output section 122. The gate voltage generation section 121 includes a bias resistor Rbias, a first source resistor RS11, and a first NMOS transistor N11, and is configured to generate a gate voltage VGATE. The variable voltage output section 122 includes an output resistor Rout1, a second source resistor RS12, and a second NMOS transistor N12, and is configured to generate a variable voltage VTEMP. The bias resistor Rbias is coupled between a supply voltage VL and a node nd11, the first NMOS transistor N11 is coupled between the node nd11 and a node nd12 and driven in response to the bias voltage VBIAS, and the first source resistor RS11 is coupled between the node nd12 and a ground voltage VSS. The output resistor Rout1 is coupled between the supply voltage VL and a node nd13 outputting the variable voltage VTEMP, the second NMOS transistor N12 is coupled between the node nd13 and a node nd14 and driven in response to the gate voltage VGATE, and the second source resistor RS12 is coupled between the node 14 and the ground voltage VSS.

Figure 3:
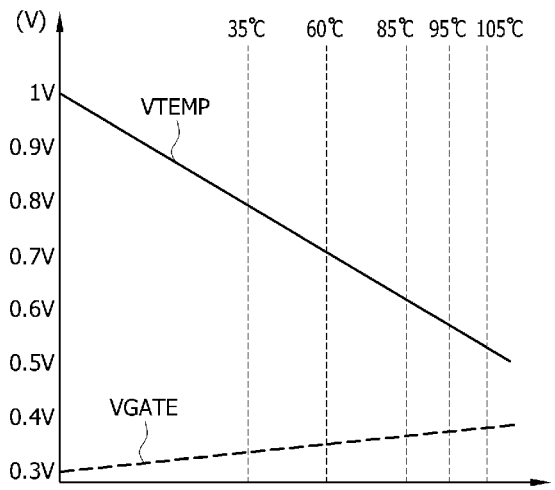
FIG. 3 is a graph showing the characteristics of a gate voltage and a variable voltage generated by the variable voltage generation unit of FIG. 2.

The characteristics of the gate voltage VGATE and the variable voltage VTEMP generated by the variable voltage generation unit 12 based on temperature change may be checked with reference to FIG. 3.

Referring to FIG. 3, the level of the gate voltage VGATE linearly increases as the temperature increases, and the level of the variable voltage VTEMP linearly decreases as the temperature increases. The linearity of the level changes of the gate voltage VGATE and the variable voltage VTEMP based on the temperature change may be described in more detail as the following equations.

First, the gate voltage VGATE may be expressed as the following equation.

$$VGATE = VL - \frac{Rbias}{RS11}[VBIAS - Vth1 - \alpha T - \alpha T0]$$

As known from the equation, resistance changes of the bias resistor Rbias and the first source resistor RS11 based on the temperature change are offset by each other. Therefore, since the level change of the gate voltage VGATE based on the temperature change depends on a threshold voltage Vth1 of the first NMOS transistor N11, the level change has linearity.

Next, the variable voltage VTEMP may be expressed as the following equation.

$$VTEMP = VL - \frac{Rout1}{RS12}[VGATE - Vth2 - \alpha T - \alpha T0]$$

As known from the equation, resistance changes of the output resistor Rout and the second source resistor RS12 based on temperature change are offset by each other. Therefore, since the level change of the gate voltage VTEMP based on the temperature change depends on a threshold voltage Vth2 of the second NMOS transistor N12, the level change has linearity.

Figure 4:
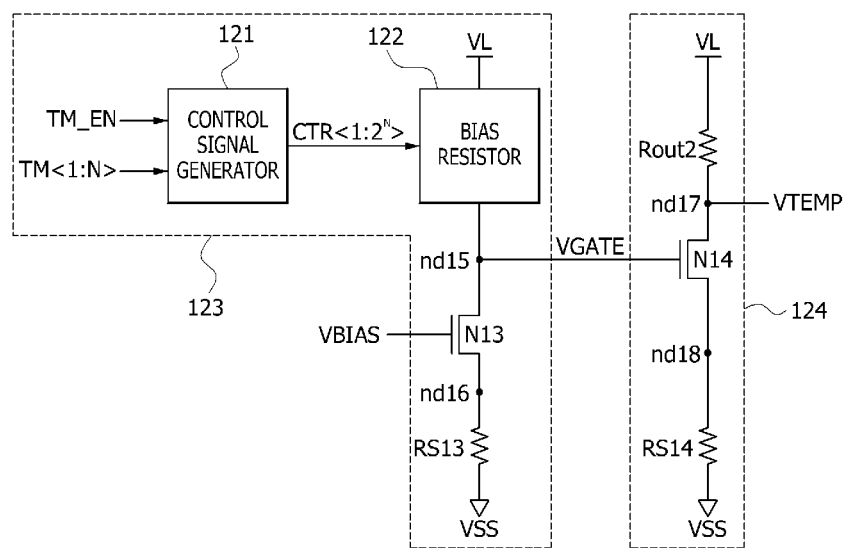
FIG. 4 is a circuit diagram illustrating a variable voltage generation unit included in a temperature sensor in accordance with an embodiment of the present invention.

Referring to FIG. 4, a variable voltage generation unit 12 in accordance with an embodiment of the present invention includes a gate voltage generation section 123 and a variable voltage output section 124.

The gate voltage generation section 123 includes a control signal generator 121, a bias resistor 122, a first NMOS transistor N13, and a first source resistor RS13. The control signal generator 121 is configured to receive a test mode enable signal TM_EN and a test mode signal TM<1:N> and generate a plurality of control signals CTR<1:2$^N$> which are selectively enabled by a test mode or fuse cutting. The bias resistor 122 is coupled between a supply voltage VL and a node nd15 and has a resistance value controlled according to the control signals CTR<1:2$^N$>. The first NMOS transistor N13 is coupled between the node nd15 and a node nd16 and driven in response to a bias voltage VBIAS. The first source resistor RS13 is coupled between the node nd16 and a ground voltage VSS.

The control signal generator 121 generates the control signals CTR<1:2$^N$> which are selectively enabled according to the test mode signal TM<1:N> when the test mode enable signal TM_EN is enabled. Furthermore, the control signal generator 121 includes a plurality of fuses. Thus, when the test mode enable signal TM_EN is disabled, the control signal generator 121 generates the control signals CTR<1:2$^N$> which are selectively enabled according to a selective cutting of the included fuses.

The variable voltage output section 124 includes an output resistor Rout1, a second NMOS transistor N14, and a source resistor RS14. The output resistor Rout1 is coupled between the supply voltage VL and a node nd17 outputting a variable voltage VTEMP. The second NMOS transistor N14 is coupled between the node nd17 and a node nd18 and driven in response to the gate voltage VGATE. The second source resistor RS14 is coupled between the node nd18 and the ground voltage VSS.

The variable voltage generation unit 12 configured in such a manner may control the resistance voltage of the bias resistor 122 according to the control signals CTR<1:2$^N$> which are selectively enabled by a test mode or fuse cutting.

Figure 5:
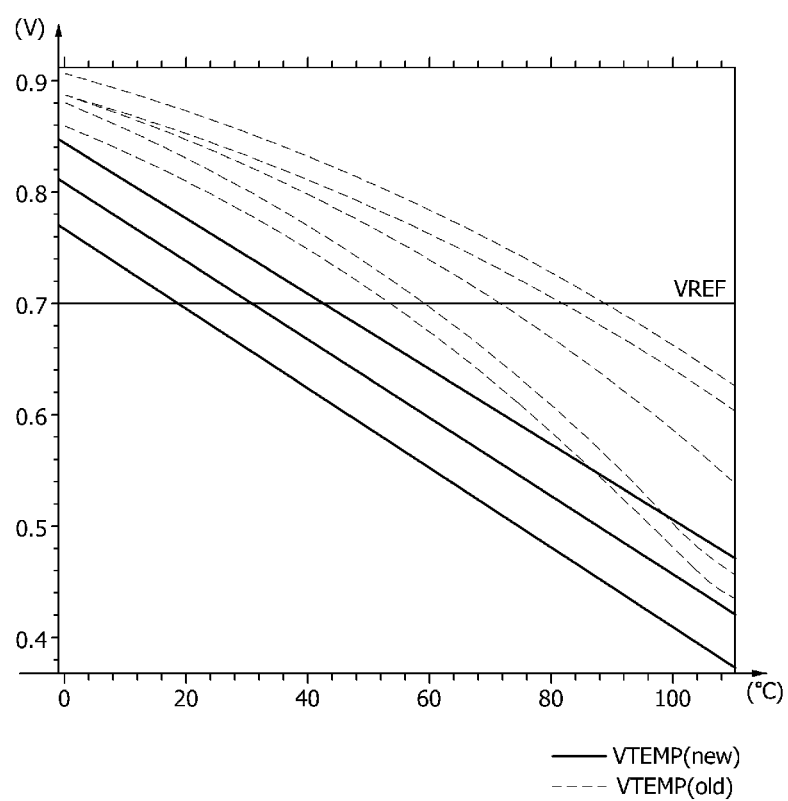
FIG. 5 is a graph explaining the operation of the temperature sensor illustrated in FIG. 1.

In accordance with the embodiments of the present invention, the temperature sensor 1 generates the variable voltage VTEMP of which the level linearly changes according to temperature change, and generates the temperature signal TQ by comparing the variable voltage VTEMP with the reference voltage VREF. That is, referring to FIG. 5, a variable voltage VTEMP(new) generated by the temperature sensor 1 in accordance with an embodiment of the present invention linearly decreases with a constant slope according to the temperature change, unlike a variable voltage VTEMP(old) generated according to a known art. Therefore, the variability of the temperature signal TQ may be easily understood even though a PVT variation occurs.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A temperature sensor comprising:
a bias resistor coupled between a supply voltage and a first node outputting a gate voltage;
a first MOS transistor coupled to the first node, and driven in response to a bias voltage;
a first source resistor coupled between the first MOS transistor and a ground voltage;
an output resistor coupled between a supply voltage and a second node outputting a variable voltage having a variable level according to temperature change;
a second MOS transistor coupled to the second node, and driven in response to the gate voltage of the second MOS transistor; and
a second source resistor coupled between the second MOS transistor and a ground voltage.

2. The temperature sensor of claim 1, wherein the gate voltage increases as the temperature increases.

3. The temperature sensor of claim 1, wherein the variable voltage decreases as the temperature increases.

4. The temperature sensor of claim 1, wherein the first and second MOS transistors are NMOS transistors.

5. A temperature sensor comprising:
a control signal generator configured to selectively enable a plurality of control signals for setting the resistance value of a bias resistor in response to a test mode signal, in the test mode;
the bias resistor coupled between a supply voltage and a first node outputting a gate voltage;
a first MOS transistor coupled to the first node, and driven in response to a bias voltage;
a first source resistor coupled between the first MOS transistor and a ground voltage;
an output resistor coupled between a supply voltage and a second node outputting a variable voltage having a variable level according to temperature change;
a second MOS transistor coupled to the second node, and driven in response to the gate voltage of the second MOS transistor; and
a second source resistor coupled between the second MOS transistor and a ground voltage.

6. The temperature sensor of claim 5, wherein the gate voltage increases as the temperature increases.

7. The temperature sensor of claim 5, wherein the control signal generator comprises a plurality of fuses which are selectively cut to selectively enable the plurality of control signals.

8. The temperature sensor of claim 5, wherein the variable voltage decreases as the temperature increases.

9. The temperature sensor of claim 5, wherein the first and second MOS transistors are NMOS transistors.

* * * * *